United States Patent
Walter et al.

(10) Patent No.: US 8,322,979 B2
(45) Date of Patent: Dec. 4, 2012

(54) PANE ARRANGEMENT FOR A TURBOCHARGER

(75) Inventors: Stefan Walter, Russingen (DE); Volker Stiegler, Gauersheim (DE)

(73) Assignee: BorgWarner Inc., Auburn Hills, MI (US)

( * ) Notice: Subject to any disclaimer, the term of this patent is extended or adjusted under 35 U.S.C. 154(b) by 1162 days.

(21) Appl. No.: 11/917,740

(22) PCT Filed: May 23, 2006

(86) PCT No.: PCT/EP2006/004905
§ 371 (c)(1),
(2), (4) Date: Jun. 27, 2008

(87) PCT Pub. No.: WO2006/133793
PCT Pub. Date: Dec. 21, 2006

(65) Prior Publication Data
US 2008/0304957 A1  Dec. 11, 2008

(30) Foreign Application Priority Data
Jun. 16, 2005   (DE) .................... 20 2005 009 491 U

(51) Int. Cl.
*F01D 25/08* (2006.01)
(52) U.S. Cl. ........................................ 415/177; 417/407
(58) Field of Classification Search .................. 415/177; 417/365, 406, 407
See application file for complete search history.

(56) References Cited

U.S. PATENT DOCUMENTS

| | | | | | |
|---|---|---|---|---|---|
| 4,364,717 | A | * | 12/1982 | Schippers et al. | 417/407 |
| 4,655,043 | A | * | 4/1987 | McInerney | 60/602 |
| 5,087,176 | A | * | 2/1992 | Wieland | 417/407 |
| 2004/0081567 | A1 | * | 4/2004 | Boening | 417/406 |
| 2006/0177319 | A1 | * | 8/2006 | Liebl et al. | 417/407 |

FOREIGN PATENT DOCUMENTS

WO   WO 2004048755 A1 *  6/2004

* cited by examiner

*Primary Examiner* — Christopher Verdier
*Assistant Examiner* — Andrew C Knopp
(74) *Attorney, Agent, or Firm* — William G. Anderson; Stephen A. Pendorf; Patent Central LLC

(57) ABSTRACT

The invention relates to a turbocharger (1) provided with a turbine housing (2) for turbine wheels, a cartridge (K) for the variable turbine geometry positioned in the turbine housing (2), a bearing housing (3) which is arranged between said turbine housing (2) and a compressor housing of the compressor wheel and in which a bearing arrangement for a shaft (W) carrying the turbine and compressor wheels is mounted and a pane system (4) placed between the cartridge (K) and the bearing housing (3). The inventive turbocharger is characterized in that said pane system (4) consists of at least two material layers (5, 6), an air gap (7) is formed between the material layers (5, 6), the materiel layer (5) is embodied in the form of a conical plate and the other material layer (6) is provided with a bend (8).

20 Claims, 2 Drawing Sheets

PANE ARRANGEMENT FOR A TURBOCHARGER

FIELD OF THE INVENTION

CROSS-REFERENCE TO RELATED APPLICATIONS

This application is a §371 national stage entry of International Application No. PCT/EP2006/004905, filed May 23, 2006, which claims priority to DE Application No. 202005009491.9, filed Jun. 16, 2005, the disclosures of which are both hereby incorporated by reference.

The invention relates to a turbocharger.

BACKGROUND OF THE INVENTION

Such a turbocharger is known from EP 1 398 463 A1. In this turbocharger, a heat shield is provided around its shaft on the turbine side and serves to protect the bearing housing from damage due to elevated temperatures on account of the exhaust gases of the internal combustion engine which flow through the turbine. The known heat shield consists of a single-layer component, the heat insulation properties of which, however, are in need of improvement.

A further arrangement is shown in EP 0 160 460 B1, a disk spring being used here which exerts an axial preloading force on the vane ring to be fixed axially. The functioning of the heat insulation is not necessary on account of the remoteness of the turbine wheel at this point.

SUMMARY OF THE INVENTION

It is therefore the object of the present invention to provide a turbocharger which firstly ensures axial fixing of the cartridge of the variable turbine geometry in the vicinity of the turbine wheel by means of a disk spring and secondly permits improved heat insulation in the direction of the bearing housing via the heat shield.

A turbocharger as described herein can achieve this object. A turbocharger (1) can include a turbine housing (2) having a turbine wheel. A cartridge (K) can be provided in the turbine housing (2). The cartridge (K) can provide variable turbine geometry. The turbocharger (1) can also include a compressor housing having a compressor wheel. The turbocharger (1) can further include a bearing housing (3) between the turbine housing (2) and the compressor housing. The bearing housing (3) can have a bearing for a shaft (W) carrying the turbine wheel and the compressor wheel. A disk arrangement (4) can be provided between the cartridge (K) and the bearing housing (3). The disk arrangement (4) can include at least two structures (5, 6). An air gap (7) can be formed between the two structures (5, 6). One of the structures (5) can be a conical disk, and the other structure (6) can have a bend (8) therein.

In addition, liquid cooling of the bearing housing can possibly be advantageously dispensed with.

Due to the provision of a plurality of material layers, it becomes possible to provide an air gap between the material layers in order to further improve the preloading force properties and/or the heat insulation properties.

To this end, one of the material layers is provided with a bend which provides two regions arranged at a preferably obtuse angle to one another, while the other material layer is designed as a disk in accordance with a Belleville spring.

The turbocharger (1) can have additional features that can provide advantages. For instance, the two or more structures (5, 6) can have respective center apertures (16, 17). In one embodiment, the center apertures (16, 17) can be the same diameter. The two or more structures (5, 6) can each have an associated outer diameter. In at least some instances, the outer diameters of the two or more structures (5, 6) can be the same. In one implementation, only the conical disk (5) can abut against the bearing housing (3) along an inside diameter of the conical disk. The two or more structures (5, 6) can be separate parts that abut against each other. The two or more structures (5, 6) can be axially restrained along at least a portion of an outside diameter of the two or more structures (5, 6). In some arrangements, the two or more structures (5, 6) can be made of the same material. In other arrangements, the two or more structures (5, 6) can be made of different materials. In one embodiment, the structure (6) that has a bend (8) can be made from a material that can provide thermal insulation for the structure (5) that is a conical disk.

The material layers form two separate parts, preferably shaped plates, which rest one on top of the other in the region of their outside diameter.

Furthermore, it is in principle possible for the material layers to be made of the same material or for different materials to be selected.

BRIEF DESCRIPTION OF THE DRAWINGS

Further details, advantages and features of the present invention follow from the description below with reference to the drawing, in which.

DETAILED DESCRIPTION OF THE INVENTION

Figure 1:
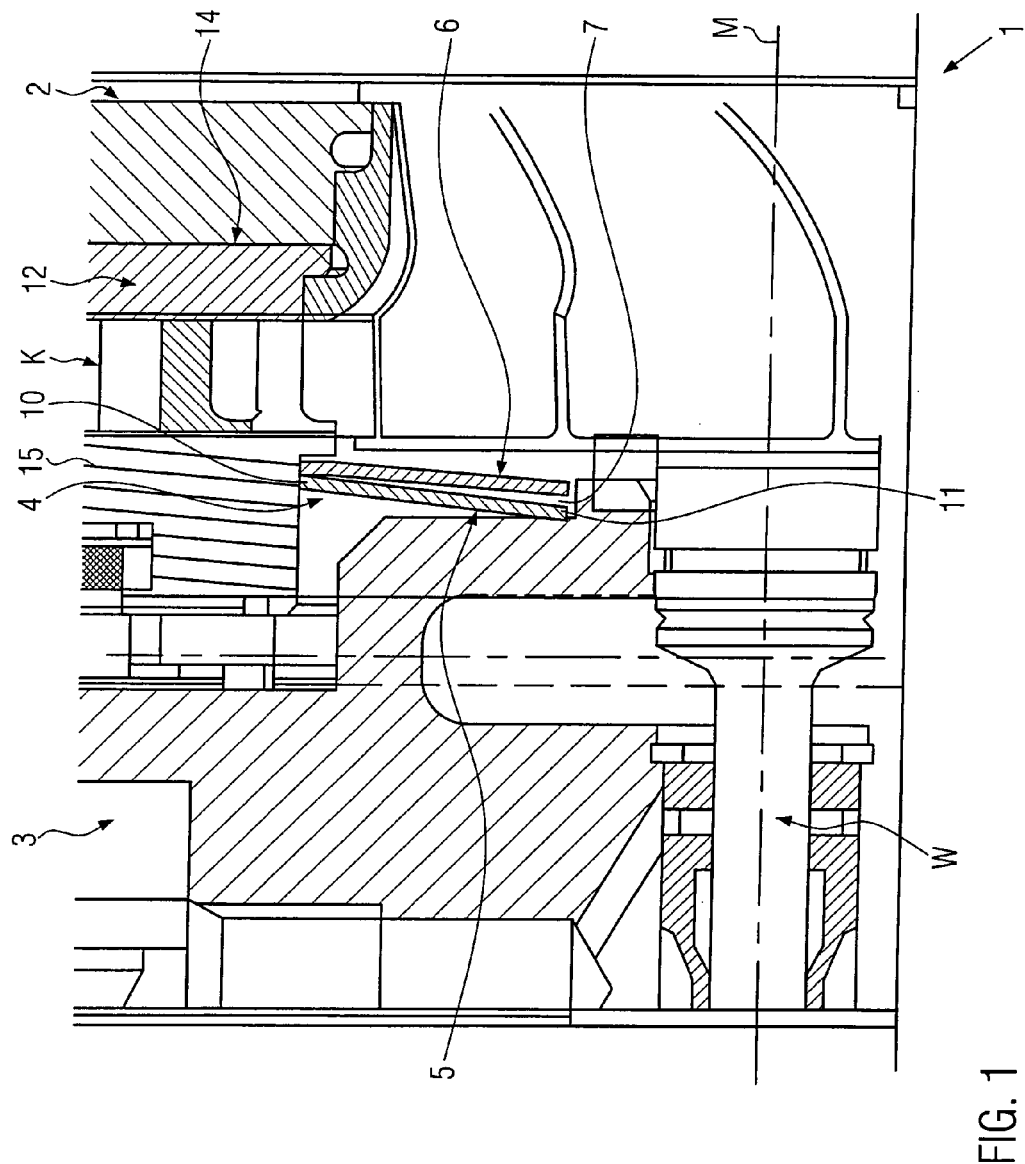
FIG. 1 shows part of a turbocharger according to the invention with a disk arrangement according to the invention.

A section of a turbocharger 1 according to the invention is shown in FIG. 1, since this illustration is sufficient for the explanation of the principles according to the invention. Of course, the turbocharger 1 has all the constructional elements normally provided, which, however, as stated, are omitted in FIG. 1 in order to simplify the illustration.

Therefore a turbine housing 2 of a turbine is shown in FIG. 1, said turbine housing 2 being arranged adjacent to a bearing housing 3. This bearing housing 3 is arranged between the turbine housing 2 and a compressor housing (not shown) of a compressor wheel (likewise not depicted). The bearing housing 3 has the bearing for a shaft, which in FIG. 1 is symbolized by the dot-dash center line M, since FIG. 1 only reproduces the top section of the turbocharger 1 according to the invention.

The shaft W carries the turbine and the compressor wheel and is mounted in the bearing housing 3 via a suitable bearing arrangement.

A disk arrangement 4 of multi-layer design is clamped in place between the bearing housing 3 and a cartridge K which is formed by a VTG disk 12 having an axial stop 14 and a vane ring 15 and is arranged in the turbine housing 2 in an axially displaceable manner. Here, in the example, there are two material layers 5 and 6, which are explained in more detail below with reference to FIG. 2.

FIG. 1 illustrates the disk arrangement 4 between the turbine housing 2 and the bearing housing 3, two supporting regions 10, 11 being obtained, with which the material layer or disk spring 5, as can be seen in detail from FIG. 1, is supported on the corresponding parts of the vane ring of the cartridge of the variable turbine geometry of the bearing housing 3.

The material layer or the inner heat shield 6 is clamped in place at the outside diameter by the disk spring 5 relative to the vane ring 15.

Figure 2:
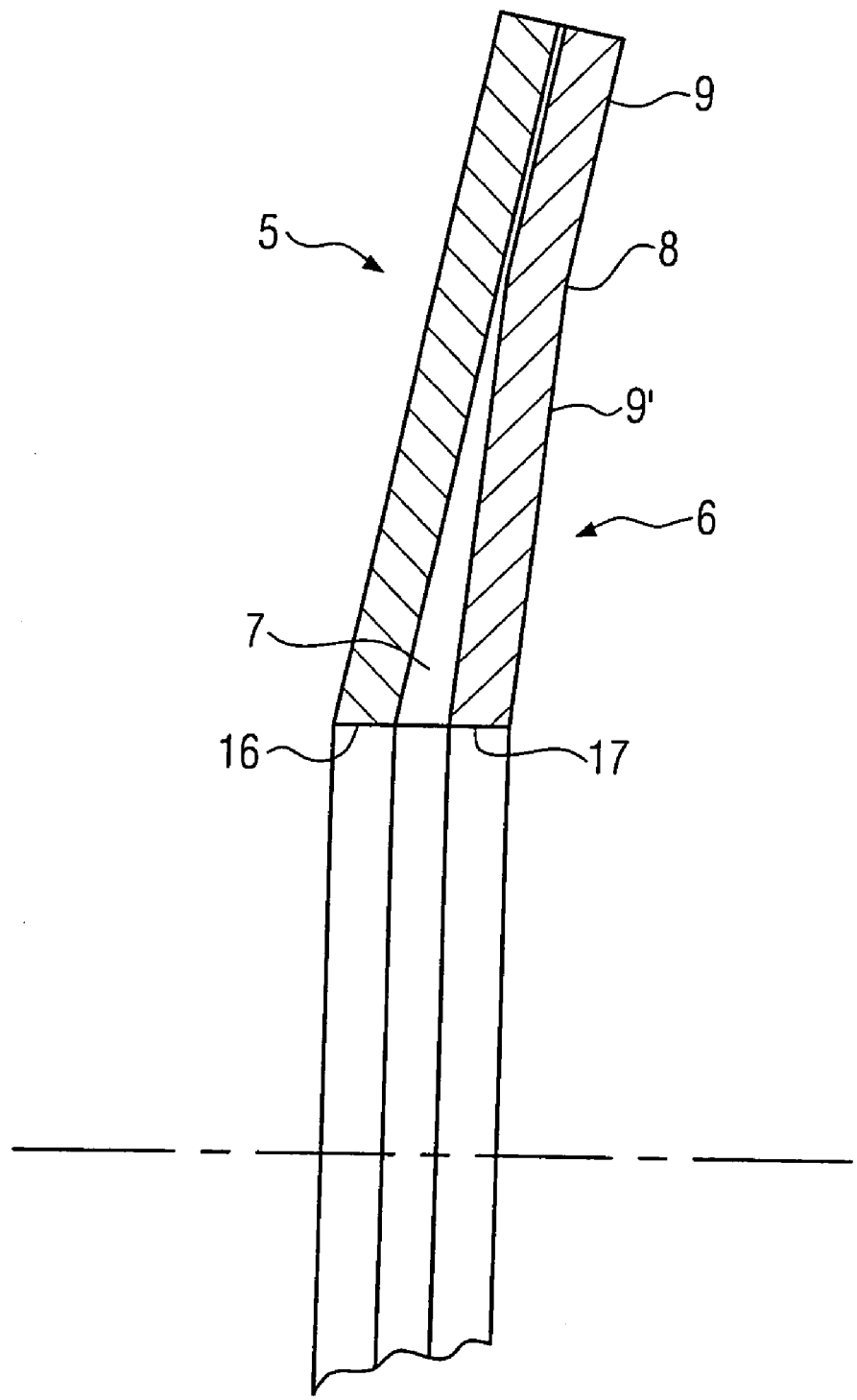
FIG. 2 shows an enlarged illustration of the disk arrangement according to the invention.

An embodiment of the disk arrangement 4 according to the invention is shown in FIG. 2. In this embodiment, the two material layers 5 and 6 are of two-piece design. FIG. 2 illustrates that the material layer or disk spring 5, which applies the axial preloading force, has a conical configuration. Furthermore, the material layer 5 has a center aperture 16, which is arranged coaxially to a center aperture 17 of the material layer 6, serving as heat shield for the material layer 5, and has an equally large diameter. Provided between the material layers 5 and 6 is an air gap 7, which further improves the heat insulation properties. This air gap 7 is achieved by the provision of a bend 8 in the heat shield 6, which divides the latter into two regions 9, 9', which are preferably arranged at an obtuse angle to one another.

LIST OF DESIGNATIONS

1 Turbocharger/exhaust gas turbocharger
2 Turbine housing
3 Bearing housing
4 Disk arrangement
5, 6 Material layers (5: disk spring for preloading;
   6: heat protection layer for layer 5 without abutment/contact at the bearing housing)
7 Air gap at the inside diameter between 5 and 6
8 Bend
9, 9' Regions of the heat shield 6
10, 11 Abutment regions
12 VTG disk
14 Axial stop
15 Vane ring
16, 17 Center apertures of 5 and 6, respectively
W Shaft
K Cartridge for the variable turbine geometry
M Center line

The invention claimed is:

1. A turbocharger (1) comprising:
   a turbine housing (2) having a turbine wheel;
   a compressor housing having a compressor wheel;
   a cartridge (K) in the turbine housing (2) providing variable turbine geometry;
   a bearing housing (3) between the turbine housing (2) and the compressor housing and having a bearing for a shaft (W) carrying the turbine wheel and the compressor wheel; and
   a disk arrangement (4) between the cartridge (K) and the bearing housing (3), wherein the disk arrangement (4) comprises at least two structures (5, 6), wherein an air gap (7) is formed between the at least two structures (5, 6), wherein one of the structures (5) is a conical disk including a conical body extending outwardly at an angle from a center aperture (16) to an outer diameter, and wherein the other one of the structures (6) includes an inner conical region (9') that extends outwardly from a center aperture (17) at an angle that is different from the angle at which the conical body extends such that the air gap (7) between the inner conical region (9') and the conical body decreases in the outward direction, the inner conical region (9') transitioning to an outer conical region (9) at a bend (8), the outer conical region (9) being angled relative to the inner conical region (9') and extending therefrom to an outer diameter of the structure (6), the outer conical region (9) being substantially parallel to the conical body.

2. The turbocharger of claim 1, wherein the center apertures (16, 17) have the same diameter.

3. The turbocharger of claim 1, wherein the at least two structures (5, 6) have the same outer diameter.

4. The turbocharger of claim 1, wherein only the conical disk (5) abuts against the bearing housing (3) along an inside diameter of the conical disk.

5. The turbocharger of claim 1, wherein the at least two structures (5, 6) are separate parts that abut against each other.

6. The turbocharger of claim 1, wherein the at least two structures (6) are axially restrained along at least a portion of an outside diameter of the at least two structures (5).

7. The turbocharger of claim 1, wherein the at least two structures (5, 6) are made of the same material.

8. The turbocharger of claim 1, wherein the at least two structures (5, 6) are made of different materials.

9. The turbocharger of claim 1, wherein the structure (6) having the bend (8) is made from a material that provides thermal insulation for the structure (5) that is the conical disk.

10. A turbocharger (1) comprising:
    a turbine housing (2) having a turbine wheel;
    a compressor housing having a compressor wheel;
    a vane ring (15) in the turbine housing (2) providing variable turbine geometry;
    a bearing housing (3) between the turbine housing (2) and the compressor housing and having a bearing for a shaft (W) carrying the turbine wheel and the compressor wheel; and
    a disk arrangement (4) between the vane ring (15) and the bearing housing (3), wherein the disk arrangement (4) comprises first and second disks (5, 6) that abut against a portion of each other and provide an air gap (7) therebetween, wherein the first disk (5) biases the second disk (6) against the turbine housing, the first disk (5) including a conical body extending outwardly at an angle from a center aperture (16) to an outer diameter, the second disk (6) having an inner conical region (9') that extends outwardly from a center aperture (17) at an angle that is different from the angle at which the conical body extends, the inner conical region (9') transitioning to an outer conical region (9) at a bend (8), the outer conical region (9) being angled relative to the inner conical region (9') and extending therefrom to an outer diameter of the structure (6), the outer conical region (9) extending substantially parallel to and abutting against the conical body, wherein the air gap (7) is formed at least between the inner conical region (9') and the conical body, the air gap (7) decreasing in the outward direction.

11. The turbocharger claim 10, wherein the center apertures (16, 17) have the same diameter.

12. The turbocharger of claim 10, wherein the first and second disks (5, 6) have the same outer diameter.

13. The turbocharger of claim 10, wherein only the first disk (5) abuts against the bearing housing (3) along an inside diameter of the first disk (5).

14. The turbocharger of claim 10, wherein the first and second disks (5, 6) are separate parts that abut against each other.

15. The turbocharger of claim 10, wherein the first and second disks (5, 6) are axially restrained along at least a portion of an outside diameter thereof.

16. The turbocharger of claim 10, wherein the first and second disks (5, 6) are made of the same material.

17. The turbocharger of claim 10, wherein the first and second disks (5, 6) are made of different materials.

18. The turbocharger of claim 10, wherein the second disk (6) is made from a material that provides thermal insulation for the first disk (5).

19. A turbocharger (1) comprising:
a first housing (2) having a turbine wheel;
a compressor wheel;
a vane ring (15) in the first housing (2) providing variable turbine geometry;
a second housing (3) having a bearing for a shaft (W) carrying the turbine wheel and the compressor wheel; and
a disk arrangement (4) between the vane ring (15) and the second housing (3), wherein the disk arrangement (4) comprises first and second disks (5, 6) that abut against a portion of each other and provide an air gap (7) therebetween, wherein the first disk (5) has a conical shape and biases the second disk (6) against the first housing, the first disk (5) including a conical body extending outwardly at an angle from a center aperture (16) to an outer diameter, the second disk (6) having an inner conical region (9') that extends outwardly from a center aperture (17) at an angle that is different from the angle at which the conical body extends, the inner conical region (9') transitioning to an outer conical region (9) at a bend (8), the outer conical region (9) being angled relative to the inner conical region (9') and extending therefrom to an outer diameter of the structure (6), the outer conical region (9) extending substantially parallel to and abutting against the conical body, wherein the air gap (7) is formed at least between the inner conical region (9') and the conical body, the air gap (7) decreasing in the outward direction.

20. The turbocharger of claim 19, wherein the second disk (6) is made from a material that provides thermal insulation for the first disk (5).

\* \* \* \* \*